United States Patent [19]

Lin

[11] Patent Number: 5,471,912
[45] Date of Patent: Dec. 5, 1995

[54] VESSEL HAVING BOILING INDICATING DEVICE

[76] Inventor: Chia-Meng Lin, No. 11-9, Lane 115, Shui-Yuan Rd., Fong-Yuan City, Taichung County, Taiwan

[21] Appl. No.: 364,942

[22] Filed: Dec. 28, 1994

[51] Int. Cl.[6] .............................. A47J 27/00; A47J 27/212
[52] U.S. Cl. .................... 99/344; 99/285; 99/403; 116/67 R; 116/70; 116/137 R; 126/388
[58] Field of Search .............................. 99/342–344, 285, 99/281, 288, 293, 300, DIG. 14, 334, 403, 451; 116/67 R, 70, 137 R, 141, 102, 101, 103, 148; 126/388

[56] References Cited

U.S. PATENT DOCUMENTS

| | | | |
|---|---|---|---|
| 3,916,818 | 11/1975 | Barr et al. | 116/70 |
| 4,137,832 | 2/1979 | Lambros | 99/285 |
| 4,385,585 | 5/1983 | Lebowitz | 126/388 |
| 4,418,637 | 12/1983 | Heermans | 116/70 |
| 4,466,327 | 8/1984 | Hinton | 99/334 |
| 4,548,156 | 10/1985 | Shibata | 116/137 R |
| 4,571,580 | 2/1986 | Winteler | 99/342 |
| 4,586,455 | 5/1986 | Shibata | 116/67 R |
| 4,645,910 | 2/1987 | Chhatwal | 99/281 |
| 4,776,296 | 10/1988 | Heermans | 99/344 |
| 4,813,368 | 3/1989 | Hutter, III et al. | 116/67 R |
| 4,862,552 | 9/1989 | Remmel | 99/344 |

Primary Examiner—Timothy F. Simone
Attorney, Agent, or Firm—Morton J. Rosenberg; David I. Klein

[57] ABSTRACT

A boiling indicating device for a vessel includes an electric device disposed in a cap and having an electric board and a speaker. The electric board includes two contacts. A plate is engaged in the cap and includes a conductor for electrically contacting with one of the contacts and includes a socket for electrically contacting with the other contact. A lever has one end pivotally coupled to the socket and has the other end for electrically contacting with the conductor when water vapor applies force against the other end of the lever. The electric device includes an IC for recording various kinds of sounds.

2 Claims, 2 Drawing Sheets

VESSEL HAVING BOILING INDICATING DEVICE

BACKGROUND OF THE INVENTION

1. Field of the Invention

The present invention relates to a vessel, and more particularly to a vessel having a boiling indicating device.

2. Description of the Prior Art

Typical vessels, particularly typical pots comprise a boiling indicating device disposed in the mouth for indicating boiling of water contained within the vessels. The typical boiling indicating devices include a typical blowing whistle for generating a signal sound when water vapor escaping through the air passage of the mouth. The whistles may generate whistle only and may not generate other sounds.

The present invention has arisen to provide a novel boiling indicating device for vessels.

SUMMARY OF THE INVENTION

The primary objective of the present invention is to provide a vessel having a boiling indicating device which may generate sounds other than whistle.

In accordance with one aspect of the invention, there is provided a vessel comprising a boiling indicating device for a vessel comprising a cap including an upper portion and a lower portion having an inner thread formed therein, an electric device engaged in the upper portion of the cap and including an electric board and a speaker means, the electric board including a first contact and a second contact, a plate engaged in the cap and including a conductor secured therein and electrically contacting with the first contact, and including a socket secured therein and electrically contacting with the second contact, a ever means including a first end pivotally coupled to the socket and a second end, the first contact and the second contact being electrically contacted with each other when the second end of the lever means is contacted with the conductor, and means for retaining the plate and the electric device in the cap.

The electric device includes an IC for recording various kinds of sounds according to the shapes of the cap.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
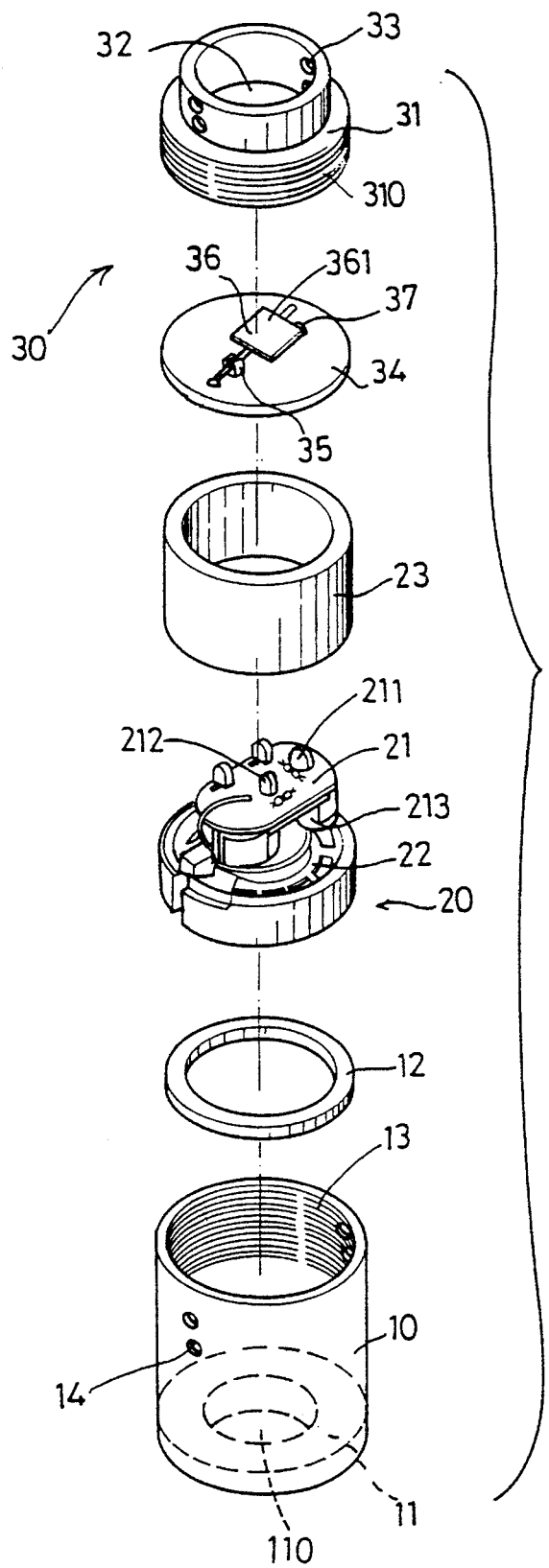
FIG. 1 is an exploded view of a boiling indicating device for a vessel in accordance with the present invention, in which the elements are shown up side down.

Referring to the drawings, and initially to FIG. 1, illustrated is a boiling indicating device in accordance with the present invention which is an exploded view as seen from the bottom portion; i.e., the elements are shown up side down in FIG. 1. The boiling indicating device is disposed in a pork 41 of a vessel 40 so as to indicate boiling of water contained in the vessel 40. The port 41 includes a number of air holes 42 laterally formed therein.

Figure 2:
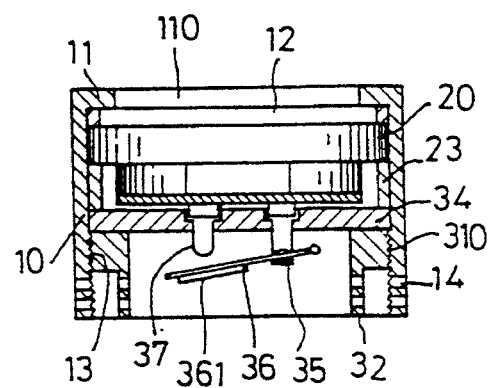
FIGS. 2 and 3 are cross sectional views illustrating the operation of the boiling indicating device.
Figure 3:
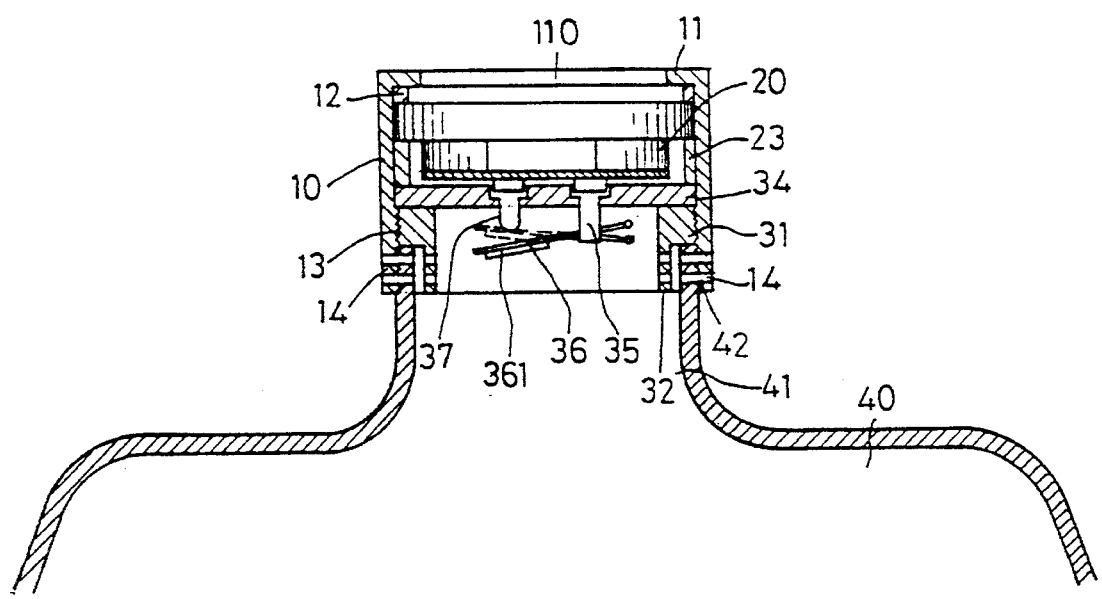

Referring next to FIGS. 1 to 3, the boiling indicating device comprises a cap 10 including an annular flange 11 formed in the upper portion so as to define an orifice 110 therein. The cap 10 includes an inner thread 13 formed in the inner portion for engaging with the outer thread of the port 41 of the vessel 40, and includes four air holes 14 for aligning with the air holes 42 of the port 41. It is preferable that the air holes 14, 42 are lateral and oblong holes 14 having suitable width for aligning with each other and for communicating with each other. A washer 12 is engaged in the cap 10 and engaged with the annular flange 11.

An electric device 20 is engaged in the cap 10 and includes an electric board 21 having two electrical contacts 211, 212, and includes a speaker 22. The electric board 21 further includes an IC 213 for pre-recording sounds therein. The cap 10 may be formed into various shapes of animals, such as cat, dog and cattle, and the IC may be recorded with sounds corresponding to the animal of the cap for generating sounds of cat, dog and cattle etc. An insulator plate 34 is engaged in the cap 10, and a spacer 23 is engaged between the plate 34 and the electric device 20 so as to form a space for accommodating the electric elements of the electric device 20. The plate 34 includes a socket 35 secured thereto and electrically contacted with the electric contact 212 of the electric board 21, and includes a conductor 37 secured therein and contacted with the other electric contact 211 of the electric board 21. A lever 36 has one end pivotally coupled to the socket 35 and has a panel 361 secured thereto for engaging with the conductor 37 such that an electric circuit is formed by the socket 35, the lever 36, the panel 361 and the conductor 37. A plug 31 includes an outer thread 310 for engaging with the inner thread 13 of the cap 10 and includes a ring element B2 having a reduced outer diameter such that an annular groove is formed between the ring element 32 and the cap 10 for receiving and for engaging with the port 41. The ring element 32 includes four or more air holes 33 formed therein for aligning and for communicating with the air holes 14, 42 from which water vapor may escape from the vessel.

In operation, as shown in FIGS. 2 and 3, the panel 361 and the lever 36 may rotate downward about the socket 35 and may be disengaged from the conductor 37 due to gravity of the panel and the lever. When water is boiled, water vapor may apply force to push the panel 361 upward so as to engage the lever 36 and the panel 361 with the conductor 37 and so as to energize the electric device 20 for generating sounds and signals for indicating boiling of water.

Accordingly, the boiling indicating device for the vessel in accordance with the present invention may signal various kinds of sounds for indicating boiling of the water.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A boiling indicating device for a vessel comprising:

a cap including an upper portion and a lower portion having an inner thread formed therein, an electric device engaged in said upper portion of said cap and including an electric board and a speaker means, said electric board including a first contact and a second contact, a plate engaged in said cap and including a conductor secured therein and electrically contacting with said first contact, and including a socket secured therein and electrically contacting with said second contact, a lever means including a first end pivotally coupled to said socket and a second end, said first contact and said second contact being electrically contacted with each other when said second end of said lever means is contacted with said conductor, and means for retaining said plate and said electric device in said cap.

2. A boiling indicating device according to claim 1, wherein said electric device includes an IC for recording various kinds of sounds.

* * * * *